United States Patent
Keiser et al.

(10) Patent No.: US 8,355,083 B2
(45) Date of Patent: Jan. 15, 2013

(54) IMAGE PROCESSING METHOD AND DEVICE FOR INSTANT REPLAY

(76) Inventors: Richard Keiser, Zürich (CH); Christoph Niederberger, Basel (CH); Stephan Wuermlin Stadler, Zürich (CH); Remo Ziegler, Uster (CH)

( * ) Notice: Subject to any disclaimer, the term of this patent is extended or adjusted under 35 U.S.C. 154(b) by 0 days.

(21) Appl. No.: 13/189,136

(22) Filed: Jul. 22, 2011

(65) Prior Publication Data
US 2012/0188452 A1    Jul. 26, 2012

(30) Foreign Application Priority Data
Jul. 29, 2010   (EP) .................................... 10405145

(51) Int. Cl.
*H04N 5/44*   (2011.01)
(52) U.S. Cl. ...................................................... 348/559
(58) Field of Classification Search .................. 348/559, 348/560, 725, 552, 553, 565, 564, 569
See application file for complete search history.

(56) References Cited

U.S. PATENT DOCUMENTS

| | | | | |
|---|---|---|---|---|
| 5,621,473 A * | 4/1997 | Hill | ............................ | 348/559 |
| 5,729,471 A | 3/1998 | Jain | | |
| 5,745,126 A | 4/1998 | Jain | | |
| 5,850,352 A | 12/1998 | Moezzi | | |
| 6,295,094 B1 * | 9/2001 | Cuccia | .......................... | 348/559 |
| 6,900,841 B1 * | 5/2005 | Mihara | ......................... | 348/345 |
| 6,980,256 B2 * | 12/2005 | Cuccia | .......................... | 348/559 |
| 7,027,073 B2 * | 4/2006 | Bodin et al. | ................. | 345/629 |
| 8,120,574 B2 * | 2/2012 | Kaneshige et al. | ........... | 345/156 |
| 2007/0052853 A1 * | 3/2007 | Yeh et al. | ...................... | 348/559 |

FOREIGN PATENT DOCUMENTS
WO   WO2007140638   12/2007

OTHER PUBLICATIONS

European Search Report for European Patent Application No. 10405145.3, Dated Dec. 29, 2010 (26 pages).
Anonymous: "ESPN Axis and How It Works", THEBESTELEVEN Blog Entry, Jun. 26, 2008, XP002615343, Retrieved from the Internet: URL:http://www.thebesteleven.com/2008/06/espn-axis-and-how-it-works.html [retrieved on Dec. 4, 2010].
Marcel Germann et al.: "Articulated Billboards for Video-based Rendering", EUROGRAPHICS 2010, vol. 29, No. 2, Jun. 7, 2010, pp. 585-594, XP002615344, Retrieved from the Internet: URL:http://onlinelibrary.wiley.com/doi/10.1111/j.1467-8659.2009.01628.x/pdf [retrieved on Dec. 16, 2010] (abstract).
ZDF SPORTSTUDIO: "Die Dortmunder Defensive—3D Analys", YOUTUBE, May 6, 2010, XP002615345, Retrieved from the Internet: URL:http://www.youtube.com/watch?v=3tlksfDdDao&feature=related [retrieved on Dec. 14, 2010].
TELECLUBAG: "Teleclub Sport LiberoVision advertisement", YOUTUBE, Apr. 23, 2010, XP002615346, Retrieved from the Internet: URL:http://www.youtube.com/watch?v=331VFF1KcXs&NR=1, [retrieved on Dec. 14, 2010].

* cited by examiner

*Primary Examiner* — Paulos M Natnael
(74) *Attorney, Agent, or Firm* — Leyendecker and Lemire, LLC; Kurt Leyendecker

(57) ABSTRACT

What is disclosed is a computer-implemented image-processing system and method for the automatic generation of video sequences that can be associated with a televised event. The methods can include the steps of: Defining a reference keyframe from a reference view from a source image sequence; From one or more keyframes, automatically computing one or more sets of virtual camera parameters; Generating a virtual camera flight path, which is described by a change of virtual camera parameters over time, and which defines a movement of a virtual camera and a corresponding change of a virtual view; and Rendering and storing a virtual video stream defined by the virtual camera flight path.

23 Claims, 3 Drawing Sheets

IMAGE PROCESSING METHOD AND DEVICE FOR INSTANT REPLAY

CROSS-REFERENCE TO RELATED APPLICATIONS

This patent application claims the benefit under the Paris Convention of European Patent Application No. 10 405 145.3, which was filed on Jul. 29, 2010, and which is incorporated by reference herein for all purposes.

BACKGROUND

The invention relates to the field of digital video image processing. It relates to an image-processing method and device for instant replay as described in the preamble of the corresponding independent claims.

In order to provide television broadcasters with instant replay capabilities, digital video servers have been developed. Such a server allows, for example, to record a number of simultaneously incoming video streams and to store them, and to output one or more video output streams consisting of one of the input streams, either live or processed. Processing may comprise the replay of a recorded video sequence, slow motion replay, still images, creating annotated or enhanced version of such sequences and images, etc. An important feature of such a video server is that it supports the production of such replays instantly; that is, within at most just a few seconds or minutes after an interesting situation has occurred. It is in this way that the term "instant" is to be understood throughout the following text.

Furthermore, systems exist for the offline analysis and creation of virtual views of 3D sports scenes, such as presented in WO 2007/140 638 A1. However, such a system is geared towards the generation of single virtual views. It is furthermore not suited for fast or instant generation of complete virtual video sequences.

BRIEF SUMMARY

The disclosure contained herein is directed to an image-processing method and device for instant replay of the type mentioned initially, which overcomes the disadvantages mentioned above.

These objects are achieved by an image-processing method and device for instant replay according to the corresponding independent claims.

Thus, the computer-implemented image-processing method is for instant replay for the automatic generation of video sequences from a televised event, wherein at least one source camera provides a source image sequence of a scene. The pose and optical settings of the camera, defining a view of the camera, are described by a set of camera parameters. The method comprises the steps of, in an online phase of the method:

- a input unit accepting a user input which defines a reference keyframe from a reference view from the source image sequence, the reference keyframe being a video image from the point in time at which the user wishes the subsequently generated virtual replay to take place;
- an image acquisition unit retrieving the reference keyframe from a recording of the source image sequence; and optionally retrieving one or more further keyframes from further views from recordings of further source image sequences of the scene, each further keyframe having been recorded at the same point in time as the reference keyframe, subsequently called keyframe point;
- a parameter computing unit automatically computing one or more sets of virtual camera parameters, each set describing a virtual view of the scene by a virtual camera;
- if more than one set of virtual camera parameters has been computed, a selecting unit selecting one of the sets for the subsequent processing steps, the virtual view defined by the selected set subsequently being called selected virtual view; or if only one set of virtual camera parameters has been computed, using the corresponding virtual view as the selected virtual view;
- a generator unit generating a virtual camera flight path which is described by a change of virtual camera parameters over time and which defines a movement of the virtual camera and a corresponding change of the virtual view
  - from a first view to the selected virtual view, the first view being the reference view or, optionally, one of the further views, and then
  - from the selected virtual view to a second view, the second view being the reference view or, optionally, one of the further views;
- a rendering unit rendering a virtual video stream defined by the virtual camera flight path; and
- an output unit doing at least one of storing the virtual video stream in a computer-readable storage device and transmitting the virtual video stream over a communication link.

The invention combines known elements with newly established methods in order to provide a total system that, given a single selection of a point in time, and without depending on any further user interaction, generates a virtual view and creates a complete virtual flight from an actual, real view into the virtual view and back again into the original or another real view.

The capability to completely automate the generation of a virtual view and a virtual flight path and an associated video stream without user interaction forms the basis for further embodiments. User interaction is preferably introduced for choosing among alternative analysis types, views or flight paths. This type of user interaction (i.e., choosing from a given set of options) is very fast and does not stand in the way of instant replay. For example, one or more virtual views are generated automatically and presented to a user for selection. The user can review and select the different views at a glance. The virtual flights may be generated together with the virtual views, or, after a particular virtual view has been selected, for that view.

In an embodiment, the movement of the scene is frozen during the virtual flight into and out of the virtual view (stopped time). In another embodiment; however, the virtual IN flight into the virtual view shows the movement of the scene during the time leading up to the keyframe point (and similarly for the virtual OUT flight after the keyframe point). Such animated virtual flights can be created by following the same decision process (for selecting keyframe(s) and optionally cameras) as for a stopped time virtual flight. The main difference is that the virtual flight is not generated from a small set of images—a single keyframe, in the extreme—but from one or more video sequences representing the scene during the IN and OUT flight.

The pose; that is, the position and orientation (or viewing direction) of a real or virtual camera, and optical parameters of the camera, such as viewing angle and/or zoom factor, etc.;

is described by a set of camera parameters. Given these parameters, a view of the scene is defined. The view may change over time as the camera parameters change by the camera; e.g., panning, zooming, moving. The view, in the context of video processing, corresponds to a video stream or to a single image or frame of a video stream. Important frames that may be singled out are called keyframes.

Thus, in one embodiment, the virtual camera flight path defines a change of the virtual view from the first view to the selected virtual view and then back to the first view. In other words, the first and the second views are identical. In another embodiment, the second view differs from the first view.

The invention provides for a fast user interaction and supports fast user decision with minimal turn-around time.

In an embodiment, the step of automatically computing one or more sets of virtual camera parameters comprises the steps of:
  automatically computing the position of objects in the scene;
  determining a classification of the situation observed in the scene, in particular by retrieving a user input that specifies this classification; and
  automatically computing at least one set of virtual camera parameters based on the position of objects in the scene and the classification of the situation.

The classification corresponds to an analysis type that is to be performed for the situation being observed. With or without a classification or an analysis type, in an embodiment, the system may furthermore automatically determine different perspectives or views for a given scene; for example, a bird's eye view (for tactical analysis), an offside view, a player's view (for shot analysis), a goalkeeper's view, etc. The system then renders the corresponding one or more views and displays them to the user as potentially interesting virtual views (PIVV), allowing him to select one. If no classification is available, the system may generate views from a set of predefined standard view types for selection by the user.

In an embodiment, the step of selecting one of the sets of virtual camera parameters defining the selected virtual view for the subsequent processing steps comprises the steps of:
  automatically generating, for each of the sets of virtual camera parameters, the corresponding virtual view and the corresponding virtual image of the scene, subsequently called virtual keyframe at this point in time; and
  displaying the virtual keyframes on an image display device and inputting a user selection indicating one of the virtual keyframes, and using the associated virtual view as the selected virtual view for the subsequent processing steps.

This corresponds to the process mentioned above that allows the user to choose from a set of given options quickly.

In a further embodiment, the method further comprises the following steps being executed in a preparatory phase preceding the online phase:
  creating a feature model, in particular a color model for the detection and separation of foreground objects from a background, including color models corresponding to different classes of foreground objects;
  determining, from multiple images obtained from a camera observing a scene with known features, fixed camera parameters that do not change during later video capturing; and
  storing the feature model and the fixed camera parameters in a computer-readable storage means, to be retrieved and used by later image processing.

The different classes of foreground objects typically correspond to different teams in a game, and also to a referee, ball, goalposts, etc. Storing the fixed camera parameters reduces the online effort to estimate the changing camera parameters.

In an embodiment, the method further comprises the following step being executed in a preparatory phase preceding the online phase:
  sampling a plurality of images from views covering a potential camera configuration space, locating and identifying features in these images and determining camera parameters corresponding to these views, and storing, as reference information, the features and feature location relative to the respective image, and storing an association from the reference information to the camera parameters in a computer-readable storage means for later retrieval for fast camera calibration based on image features.

This allows, given an online image, from the position of identifying features in the image, to retrieve an initial estimate of camera parameters or camera calibration.

In an embodiment, the method further comprises, in the preparatory phase, inputting information about playing directions of the teams, and time information associated therewith, specifying the time during which the playing direction is valid. This allows to correctly identify or analyse playing situations. For example, knowing the playing direction and knowing which side of the playing field the camera is looking at, the players in an offside situation can be classified as being on the attacking or defending team, and the offside line can be placed accordingly without user interaction.

In a further embodiment, at least two source image sequences from at least two source cameras are being processed. Thereby, foreground objects extracted from one of the source image sequences are automatically identified with foreground objects of the one or more remaining source image sequences, and automatically, without user interaction, the position of these foreground objects in the scene is determined. This step thus achieves what can be called "multi-camera object detection" without user assistance—which speeds up the correct location of individual objects/players and the analysis of a situation based thereon.

In a further embodiment, in the step of generating a virtual camera flight path, the following steps are executed for automatically determining the first view and the second view:
  if only one source image sequence is available, choosing the first and the second view to be identical to the reference view; and
  if two source image sequences are available, choosing at least one of the views to be from a source camera that is situated closer to the observed scene than the other source cameras.

This allows the system to provide, on the one hand, a more interesting flight path if the information is available, and on the other hand, an acceptable flight path even if there is less information available.

In an embodiment, one of the source cameras is designated as being a leading camera, and the source camera that is used for least one of the first and second views according to the viewing direction of the leading camera is selected automatically, preferably by selecting said source camera to be a camera that is located on the side of the leading camera towards which the leading camera is looking. This step eliminates the need for a user to select a second camera by hand.

For example, if the leading camera is looking to the right, this indicates that the scene of interest is on the right side of the playing field (as seen from the leading camera), then the leading camera or a source camera located to the right of the leading camera is chosen as one of the two cameras from or to which the virtual camera flight path leads. The other one of these two cameras can be the leading camera or again another camera, if available.

In an embodiment, for generating a virtual camera flight path, the following steps are executed:
- generating a set of virtual camera flight paths for different combinations of first view, virtual view and second view;
- displaying a graphical representation of each of the set of virtual camera flight paths on an image display device and inputting a user selection indicating one of the virtual camera flight paths; and then
- using the selected virtual camera flight path for rendering the virtual video stream.

This embodiment allows for a large flexibility when using the system, but reduces the user interaction to just the selection of one from a set of options. The graphical representation can be, for each flight path, a set of images from along the virtual flight path, or just a symbolic representation of the cameras involved in the flight path; for example, "A-B", "A-A", or "B-A" for flight paths from camera A to camera B, etc. Since the options are displayed visually, the choice can be made intuitively and very quickly. The choice may be input to the system by selecting the desired choice with a pointing device, or by hitting a dedicated input key associated with the choice.

The steps of generating the complete virtual camera flight paths and then for rendering the virtual video stream may be—depending on time and available computing power—effected before the user's choice is input, allowing the user to view a preview video of the result. Or, they may be effected while the user is presented with the choice. In this case, the system may compute some or all video streams in advance, while it waits for the user's input, discarding those video streams that are not needed later on. Or, the selected video stream may be computed only after the choice has been made.

In an embodiment, the virtual replay unit does not offer a rigid decision tree for selecting cameras, virtual views, and flight path variants. Rather, a number of variants of flight paths or key views representing different choices is maintained as long as possible, allowing an operator or director, etc., further freedom of choice.

In an embodiment, the step of generating a virtual camera flight path comprises the steps of:
- given the selected virtual view, the first view and the second view, retrieving the sets of camera parameters describing these views;
- interpolating the set of virtual camera parameters, starting with the values from the set of camera parameters corresponding to the first view, to change to the values of the set of camera parameters corresponding to the selected virtual view, and then to the values of the set of camera parameters corresponding to the second view;
- verifying, for all or for a subset of the views along the virtual camera flight path, whether the respective image for the view comprises areas for which there is no image information from the available keyframes; and
- if the amount (for example, the area) of missing image information in one or more of these views exceeds a predetermined limit, automatically or by means of a user interaction, determining one or more intermediate key views for which the amount of missing image information is smaller than for the views(s) with missing information, or zero, and computing the virtual camera flight path to pass through these key views.

This allows the system to eliminate "black holes" in the virtual view; that is, image areas for which there is no information available from the source images.

For example, the one or more intermediate key views can be generated from an existing virtual camera flight path:
- by raising the virtual camera; i.e., to provide more of a birds view of the scene;
- by moving the virtual camera closer to the scene;
- by zooming in; i.e., by reducing the viewing angle of the virtual camera; or
- a combination of two or more of the above.

In general, each of the above approaches tends to reduce the likelihood that the image from the virtual view cannot be completely generated from the keyframes.

In an embodiment, the virtual replay unit maintains and updates a model of at least the background of the scene based on the images taken at another time than the keyframes, with the source cameras pointing in another direction. The virtual replay unit then uses this time-shifted information to fill in the missing image information pertaining to the background.

In an embodiment, the step of generating a virtual camera flight path comprises the step of, when interpolating the set of virtual camera parameters, maintaining in the sequence of views of the virtual flight path a smooth movement of a stationary or moving point of interest in the scene. The point of interest is the point that a viewer is expected to look at, such as the location of the ball or the centre of activity of the players visible in the image (e.g., as determined by the centre of locations of all visible players on the field).

View and flight path generation can be summarily viewed as an optimisation problem taking into account:
- smooth movement of point of interest;
- point of interest approximately in middle of image;
- point of interest visible by two or more cameras; and
- optional: minimise image area without corresponding source image information.

In an embodiment, the method further comprises the step of, if no selected virtual view or no satisfying virtual camera flight path is determined by the virtual replay unit or chosen by the user, generating an enhanced still image from the reference keyframe or one of the further keyframes, and subsequently using the enhanced still image in place of the virtual video stream. This allows for an acceptable fallback solution to the initial task of providing a video sequence for instant replay. The enhancement can be, for example, an offside line inserted in the image.

Both such a still image and also a virtual video sequence from a virtual flight and the video sequences concatenated with the virtual video sequences may comprise further image enhancement elements such as markings for key players, arrows showing distances or direction of movement, etc. Preferably, such elements are displayed seamlessly as the concatenated sequence changes from real to virtual sequences and back.

In a further embodiment, the method comprises the steps of generating a concatenated video sequence comprising, in this order:
- a first video sequence from a first source camera leading up to and ending with the keyframe in the first view;
- the virtual video stream, starting with from the keyframe in the first view and ending with the keyframe in the second view; and
- a second video sequence from a second source camera starting with the keyframe in the second view.

In this manner, the virtual video sequence is combined with real video sequences to form a seamless composite or concatenated sequence which links the virtual (still or animated) flight to the real sequences.

In a further embodiment, the method is implemented by means of a video server interacting with a virtual replay unit. The video server is configured to record and store video input streams and is controllable to output video output streams made up of incoming and stored video input streams. The virtual replay unit is configured to generate, from the one or more keyframes corresponding to different views of the scene at the same point in time, the virtual video stream. The method comprises the steps of:

the video server transmitting to the virtual replay unit one or more keyframes, either by one of the video output streams or by a separate communication link; and the virtual replay unit generating the virtual video stream.

It is thus the case that the video server and the virtual replay unit are separately transportable and operatable devices, which allows them to be used alone in different localities, or in combination, as the need arises.

In a further embodiment, the virtual replay unit controls the video server to transmit to the virtual replay unit the one or more keyframes (i.e., the reference keyframe and the optional further keyframes), and one of the following two groups of steps is performed:

either the virtual replay unit, having computed the virtual video stream, controlling the video server to transmit to the virtual replay unit the first video sequence and the second video sequence, and the virtual replay unit concatenating the first video sequence, the virtual video stream and the second video sequence; or the virtual replay unit, having computed the virtual video stream, transmitting the virtual video stream to the video server and controlling the video server to concatenate the first video sequence, the virtual video stream and the second video sequence.

In a further embodiment, the video server transmitting to the virtual replay unit the one or more keyframes; and the video server controls the virtual replay unit to compute the virtual video stream, preferably by triggering the virtual replay unit to do so, and one of the following two groups of steps is performed:

either the video server transmitting to the virtual replay unit the first video sequence and the second video sequence, and the video server controlling the virtual replay unit to concatenate the first video sequence, the virtual video stream and the second video sequence; or the virtual replay unit, having computed the virtual video stream, transmitting the virtual video stream to the video server and controlling the video server to concatenate the first video sequence, the virtual video stream and the second video sequence.

The expression "controlling" used in the above corresponds to the triggering of an action or computation, or to the issuing of control commands by a controlling entity, with the execution of the commands taking place in the entity being controlled.

A computer program product for the image processing for instant replay according to the invention is loadable into an internal memory of a digital computer, and comprises computer program code means to make, when said computer program code means is loaded in the computer, the computer execute the method according to the invention. In an embodiment, the computer program product comprises a non-transitory computer-readable medium, having the computer program code means recorded thereon.

The virtual replay unit comprises one or more programmable computer data processing units and is programmed to input one or more keyframes, to perform the steps of the method according to the invention, and to output at least one virtual video stream generated according to said method.

Further embodiments are evident from the dependent patent claims. Features of the method claims may be combined with features of the device claims and vice versa.

BRIEF DESCRIPTION OF THE DRAWINGS

The inventive concepts will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
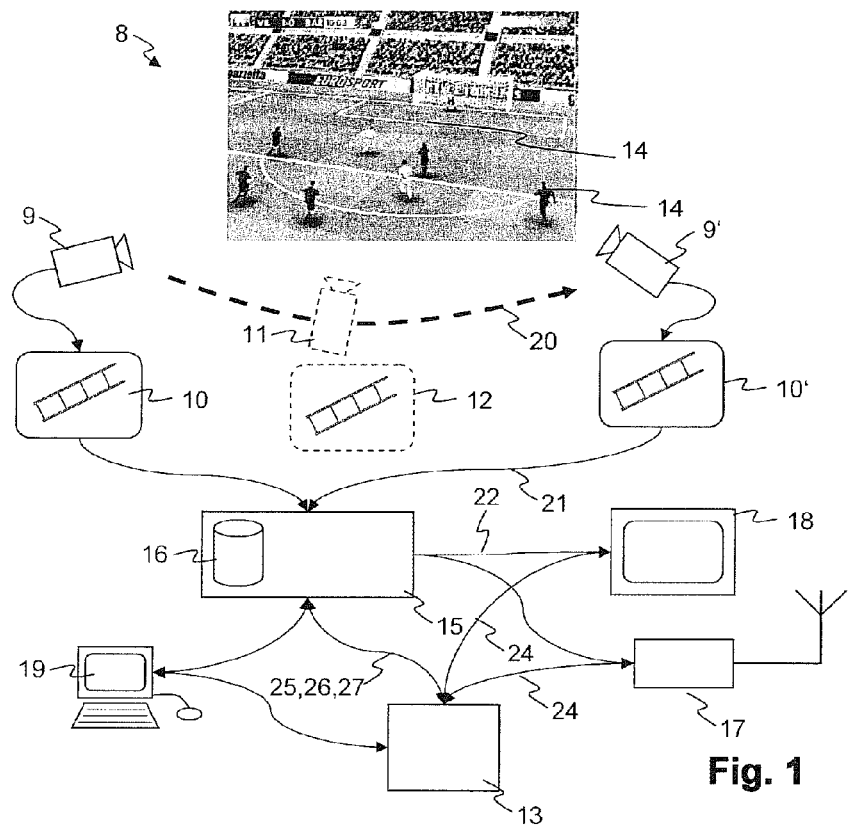
FIG. 1 schematically shows a configuration of video generating and processing units observing a scene.

FIG. 1 schematically shows a configuration of video generating and processing units observing a scene.

One or more source cameras 9, 9' are arranged to observe a scene 8 such as a group of players on a playing field. The playing field and other stationary elements are considered to be the background, the players are considered as moving real world objects 14. Each source camera 9, 9' generates a source video stream, or, more generally, a source image sequence 10, 10' which is input as a video input stream 21 to a video server 15 and is stored in a storage unit 16, typically in digital form on a hard disk or equivalent non-volatile storage device.

A interface unit 19 is represented as controlling the virtual replay unit 13 and the video server 15. The interface unit 19 may be a control console dedicated mainly to the operation of the video server 15, with certain dedicated control commands being sent directly to the virtual replay unit 13 or being forwarded by the video server 15 to the virtual replay unit 13. In other embodiments, two physically distinct interface units 19 are provided for the virtual replay unit 13 and video server 15. If the virtual replay unit 13 has its own interface unit 19, then the virtual replay unit 13 may be configured to issue dedicated commands to control the video server 15, the commands being generated automatically by the virtual replay unit 13 and/or based on user input at its interface unit 19.

The video server 15 is usually equipped to generate video output streams 22, and the virtual replay unit 13 is usually equipped to generate its own video stream output 24. These video streams are displayed on video display devices 18 and/or transmitted via a transmitter 17.

The virtual replay unit 13 conceptually adds one or more virtual cameras 11 to the scene 8, and creates virtual images and virtual video streams of the scene 8 as seen from locations where no physical source cameras 9, 9' are present, based on the source image sequences 10, 10'.

From the point of view of the virtual replay unit 13, a camera may thus be one of one or more the physical source cameras 9, 9' observing a scene 8, or a virtual camera 11. The virtual images and video streams correspond to virtual views of the scene 8. The virtual views are described by virtual camera parameters. A virtual camera flight path 20 is a sequence of virtual views and can be described by a change (or course or trajectory) of virtual camera parameters over (simulated) time and defines a movement of the virtual camera 11.

The process of determining the camera parameters of physical cameras, as they change over time is called camera calibration. In principle, this can be done by measuring the parameters by dedicated hardware. In practice, calibration is preferably done based on the camera's video stream alone, by using, for example, a combination of:

- a priori position information generated in a pre-processing stage, based on the detection of characteristic scene features, such as playing field markings (line positions, corners, circles, etc.); and
- online orientation information based on characteristic scene features and/or on the differences between the frames of a video stream.

Figure 2:
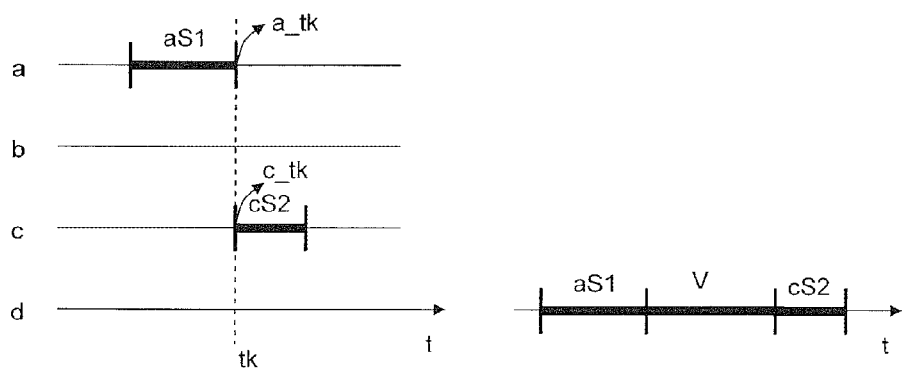
FIG. 2 shows the combination of video sequences from different video streams.

FIG. 2 schematically shows the concatenation of video sequences from different video streams: Given the stored source image sequences 10, 10', individually labelled as a, b, c, d, an operator selects a frame from one of the source image sequences 10, 10', thereby also selecting a corresponding point in time or keyframe point tk. The selected frame is called reference keyframe. Frames from the other source image sequences 10, 10' taken at the same time shall be called further keyframes. Video streams are denoted by a, b, c, d. Individual frames are denoted by a_t, b_t, etc., where t is the time at which the frame was recorded. For the keyframes, the time (or keyframe point in time) is denoted by tk. Video sequences; that is, short (several seconds or minutes) continuous subsections of a video stream; are denoted by aS1, cS2, V (left half of FIG. 2). The virtual replay unit 13 generates a virtual video stream V as seen from the virtual camera 11 and preferably combines this with an introductory video sequence aS1 leading up to the keyframe point, and a subsequent video sequence cS2 continuing for a short time after the keyframe point (right half of FIG. 2). Preferably, the virtual video stream V corresponds to a movement of the virtual camera 11 from the pose of one source camera 9 to another source camera 9', along a virtual camera flight path 20.

The movement of the virtual camera 11 preferably takes place with the movement of the real world objects 14 being stopped; i.e., the virtual views generated along the virtual camera flight path 20 all show the scene 8 at the same point in time (the keyframe point). Furthermore, the movement of the virtual camera 11 preferably stops at one or more stop points along the virtual camera flight path 20, which results in a still image of the scene 8 as seen from these stop points at the keyframe point in time. When rendering the virtual views—along the virtual camera flight path 20 and/or during the stops—the virtual view can be enhanced; e.g. by the automatic or manual insertion of markers, characteristic lines (such as offside line, first down line, etc.), annotations generated by a commentator, etc.

FIGS. 3-6 schematically show different configurations for interacting virtual replay unit and video server. In all configurations, the video server 15 receives the video input streams 21 and generates video output streams 22. The virtual replay unit 13 receives at least the keyframes a_tk, c_tk, and in some configurations, also entire video sequences aS1, cS2. It does so through either a video (stream) input 23 that is connected to one of the video output streams 22, or through a communication link 25 which may, for example, be Ethernet based.

Figure 3:
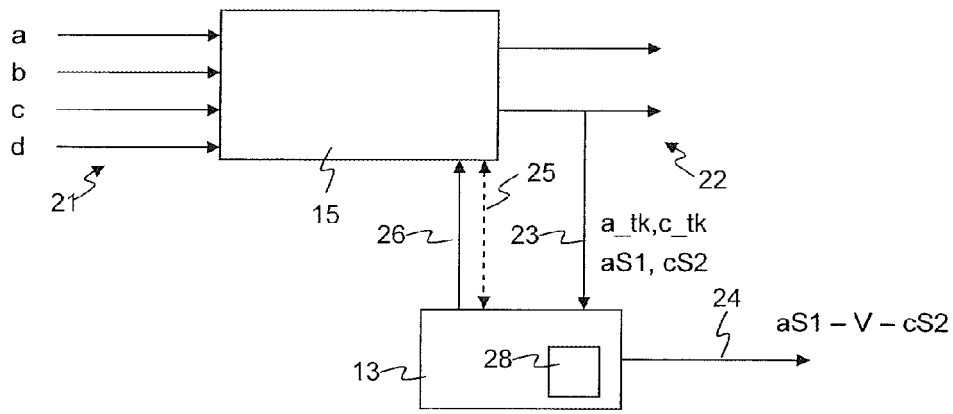
FIGS. 3-6 schematically show different configurations for interacting virtual replay unit and video server.
Figure 4:
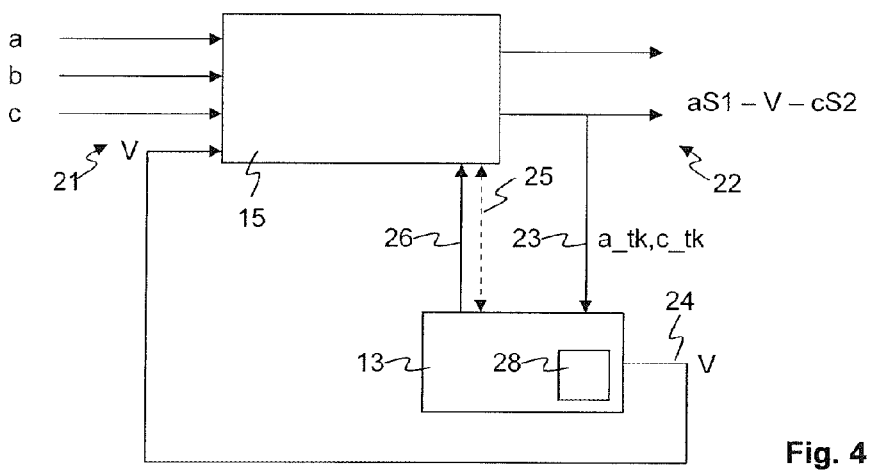

In the configurations of FIGS. 3 and 4, the virtual replay unit 13 is configured to control the video server 15 via a first control link 26. The virtual replay unit 13 comprises a replay unit control interface 28 (which may also be identical to or part of the interface unit 19 described in relation with FIG. 1), which serves at least for triggering the generation of an instant replay sequence for a selected keyframe point. Control commands transmitted over the first control link 26 then cause the video server 15 to transmit one or more keyframes a_tk, c_tk from selected video input streams 21. After the virtual video stream V has been generated by the virtual replay unit 13, according to the embodiment of FIG. 3, the virtual replay unit 13 issues further commands over the first control link 26 to have the video server 15 send the introductory video sequence aS1 and the subsequent video sequence cS2 to the virtual replay unit 13, which then concatenates them with the virtual video stream V as explained above, and provides the combined sequence at its video stream output 24. In the embodiment of FIG. 4, the virtual replay unit 13 sends the virtual video stream V through its video stream output 24 to the video server 15, and controls the video server 15 by means of the first control link 26 to effect the concatenation with the introductory video sequence aS1 and the subsequent video sequence cS2 stored in the video server 15.

Figure 5:
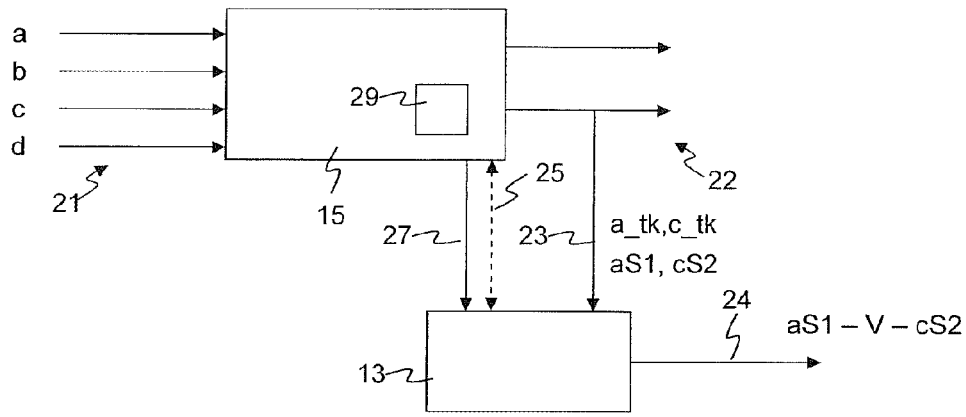
Figure 6:
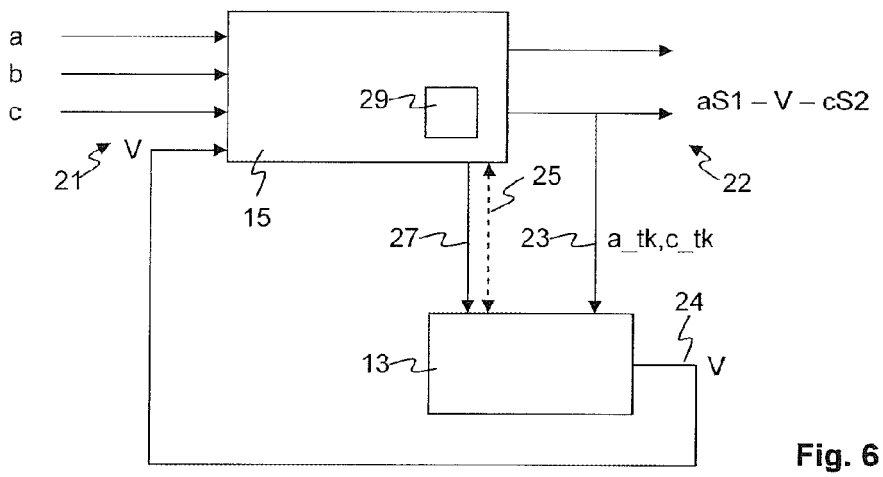

In the configurations of FIGS. 5 and 6, the video server 15 is configured to control the virtual replay unit 13 via a second control link 27. The video server 15 comprises a server control interface 29 (which may also be identical to or part of the interface unit 19 described in relation with FIG. 1), which serves at least for triggering the generation of an instant replay sequence for a selected keyframe point. Control commands transmitted over the second control link 27 then cause the virtual replay unit 13 to process the one or more keyframes a_tk, c_tk received from the video server 15. After the virtual video stream V has been generated by the virtual replay unit 13, according to the embodiment of FIG. 5, the video server 15 issues further commands over the second control link 27 to have the virtual replay unit 13 receive the introductory video sequence aS1 and the subsequent video sequence cS2 sent by the video server 15 and to concatenate them with the virtual video stream V as explained above, and to provide the combined sequence at its video stream output 24. In the embodiment of FIG. 6, automatically or triggered through the second control link 27, the virtual replay unit 13 sends the virtual video stream V through its video stream output 24 to the video server 15. The video server 15 then effects the concatenation with the introductory video sequence aS1 and the subsequent video sequence cS2 stored in the video server 15.

Figure 7:
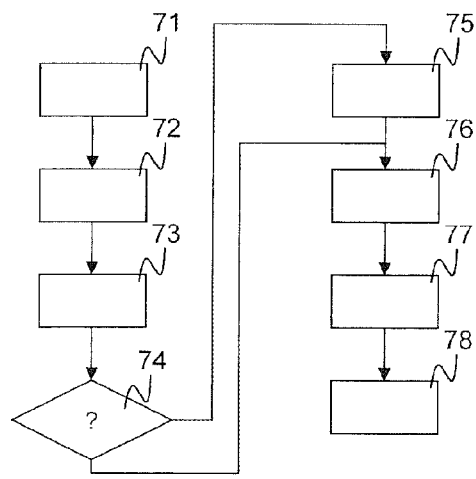
FIG. 7 a flow diagram of the method according to the invention.

FIG. 7 shows a flow diagram of the method according to the invention, with the steps of:
- inputting 71a user input;
- retrieving 72 the reference keyframe;
- automatically computing 73 one or more sets of virtual camera parameters;
- branching execution, if 74 more than one set of virtual camera parameters has been computed;
- selecting 75 one of the sets;
- generating 76 a virtual camera flight path;
- rendering 77 a virtual video stream; and
- storing or transmitting 78 the virtual video stream.

Figure 8:
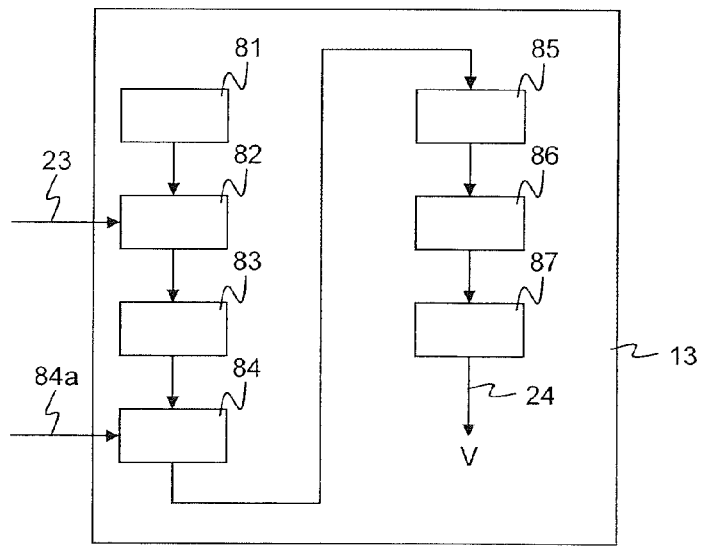
FIG. 8 a structure of a system implementing the method.

FIG. 8 shows the structure and the main data flow of a virtual replay unit 13 implementing the method according to the invention, with an input unit 81, an image acquisition unit 82, a parameter computing unit 83, a selecting unit 84 using an optional user selection input 84a, a generator unit 85, a rendering unit 86, and an output unit 87.

Minimal Workflow Description (for Virtual Analysis)
Preparation Steps (Offline)
  An operator performs the following steps to generate the required information that allows for subsequent fast processing of a scene for generating one or more virtual views:
    Feature model creation for the segmentation; i.e., the detection and separation of foreground objects (typically players) from background (typically a playing field). In the following, reference will be made mainly to color models, it is however to be understood that other feature models such as shape models or edge models may be used for segmentation alternatively to or in combination with color models.
      This includes different color models for different teams to distinguish players from different teams and assign the respective team to each object. A color model is a probabilistic model for the color distribution of pixels of a particular class of objects. For example, a color model may be a Gaussian Mixture Model.
      It preferably also includes color models of physical objects like a goal.
    Camera calibration for a set of potentially available views for subsequent fast calibration detection during (online) processing:
      Output: One camera model for each physical camera, the camera model comprising parameters that describe the position and orientation of the camera with respect to the scene, and optical parameters of the camera. A typical set of such parameters is: COP (that is, the location of the center of projection); pan, roll, and tilt angles; zoom (or focal length); different internal parameters (e.g., one or more parameters characterising image distortion). Other sets of parameters representing the same information may be used alternatively. Throughout this document, the terms "camera calibration" and "camera parameters" shall be used interchangeably. The term "calibration" or "calibration detection" as a verb will denote the activity of determining the camera parameters.
      The camera model comprises fixed camera parameters; that is, parameters that do not change during later video capturing and processing. The determination of these fixed parameters is preferably done based on multiple views of the scene, in which known features of the scene, such as playing field markings, are detected. Given the location of these features in the images, the camera parameters are computed. Of these parameters, the fixed parameters are, typically: COP, internal parameters (distortion), and possibly also the roll angle. Given the values of these fixed parameters, the parameter estimation that takes place later on during processing can be done more efficiently and more robustly.
      A computer-readable camera database is created, comprising the camera model and in particular the fixed camera parameters for later retrieval during processing of a scene.
      In order to further accelerate the camera calibration during processing, preferably a plurality of images, representing a plurality of views, is analyzed, giving for each image the location and identity of the features such as field markings in the image ("what does the camera see in this image"), and associated camera parameters ("where is the camera looking in this image"). A further camera (calibration) database is preferably created, comprising the location and identity of the features and, associated therewith, the camera parameters. Given this information, the later processing shall, after having detected the features in a given image, be able to retrieve an initial estimate of the camera parameters. In other words, the calibration database represents the characteristics of known features, in particular their location within an image, in association with camera parameters, in a densely sampled potential camera configuration space.
    For each half time in soccer:
      Manually indicate which team plays in which direction; or
      Compute the play direction based on initial information and according to the time passed since game start
  Processing a Scene (Online)
    Input: A video sequence of a sports scene from at least one angle or view.
    Input from an operator indicating a specific frame or a specific sequence for an analysis (reference keyframe, or simply KEYFRAME)
    Output: A new video sequence showing the scene before the KEYFRAME during a predefined time (pre-sequence length), stopping and displaying a flight of a virtual camera from one of the given views; i.e., from the given angle into a completely virtual perspective (different from the real camera(s)), preferably a time-freeze sequence, and then a flight of the virtual camera back to the initial given view, or to the view of another camera, and then continuing playback in the corresponding real camera.
  Automatic Processing Steps
    The following describes the online processing in more detail:
    Optional: Keyframe Selection
      From one or more video streams, an operator selects one or more frames that show the same moment of time from different perspectives (=KEYFRAMEs)
        If pre-synchronized multiple streams (that is, video streams with associated time information, generated automatically or from a known time offset between the streams) are available, the operator selects only one frame in one stream and optionally only selects different streams, without having to indicate the exact frame in these streams because the timecode is known.
      Output: The KEYFRAME(s)
        Optional: depending on video infrastructure additional information such as:
          Camera source identification per KEYFRAME. This source identification can include network or server information in order to uniquely identify a particular video stream in a multi-server environment.
          Timecode information per KEYFRAME
      In an embodiment, the virtual replay unit 13 is operably connected to a video server 15. Then the keyframe definition can be realized in the following manner:
        General setup or structure:
          If the video server 15 infrastructure can record one or multiple isolated camera streams in parallel, the virtual replay unit 13 can access these from a single point:
            This is done, for example, by one output stream (conceptually called "player") or a network connection (over the communication link 25) of the video server 15 providing a video output stream 22. The virtual replay unit 13 controls one or more output streams/players using a controller mechanism or replay unit control interface 28 (e.g., a controller cable and a controller communication protocol) to provide a video signal defined by the virtual replay unit 13. The controller mechanism 28 can then, controlled by the user, control the video server 15 to:

- Change the current video output by playing, fast forward, fast rewind, or jump to a specific timecode frame.
- Change the current video by changing the input source to a different incoming isolated camera stream or clip.
  In a networked environment, that stream can come from a remote machine, too.
- Create clips.

The controller mechanism can be set up such that the video server 15 can be operated by a controller of its own and (in parallel) by the virtual replay unit 13.

To define the KEYFRAME, a "push" or a "pull" method can be implemented:

Push: The video server 15 infrastructure can have means to push the information to the virtual replay unit 13. For example, by pressing a button on a video server 15 control unit 29, the current frame is pushed to the virtual replay unit 13 which is in a wait mode.

Variant a: The system then receives one or more pictures of the remaining keyframes from other source image sequences 10, 10' for the next processing step.

Variant b: The virtual replay unit 13 receives camera and timecode information and controls the video server to provide the video frames at the defined keyframe point.

Variant c: The virtual replay unit 13 only receives a timecode information, being in a pre-synchronized setup, in which each relevant video stream comprises timing information and in which a selected set of potentially interesting camera sources (from a multitude of video sources) is already defined. This information is sufficient to retrieve the potentially interesting keyframes from the video server 15.

Pull:

The operator uses a controller unit 28, 29 (of the video server 15 and/or of the virtual replay unit 13) to provide the reference keyframe to be processed and then starts the processing (for example by pressing a button on the keyboard attached to the virtual replay unit 13).

Such a controller unit 28, 29 can be, for example, an EVS controller, a Mouse & keyboard, a USB Shuttle, or any standard video controller.

If the video server 15 infrastructure provides multiple isolated camera streams in parallel, the virtual replay unit 13 can then access other (previously defined) camera streams and collect from them multiple keyframes for later processing.

Ingest of Keyframe Pictures
  Input: video stream(s) and KEYFRAME
    Optional: camera source and/or timecode information per keyframe
  Processing: The system retrieves, as further keyframes, the picture(s) of the video sequence of the KEYFRAME.
    Optionally: Ingest video information from before and after the keyframe, from one or more of the (stored) source image sequences 10, 10' from the video server 15 to the virtual replay unit 13 for the playout step.
  Output: one or more keyframe pictures and, if available, the timecode and keyframe information; i.e., the source camera or video stream identification for the keyframe.

Calibration Detection
  Input: keyframe pictures, camera models from preparation steps
  Optional Input:
    Knowledge from which physical camera a given keyframe picture is. In remote production environments, the video source denotes a 1:1 relationship to a camera. That is, each video source comes from or is connected to one specific physical camera. Thus, if the video source identification is known, then the physical camera is also known automatically, provided that the user has defined this relationship during the preprocessing stage.
    Or user input assigning a physical camera to the view.
    Or find the best match to the camera specific databases.
  Processing: From the pictures and the stored camera model information, the system detects the camera calibration information (calibration matrix) for each given input picture (Manual refinement is possible). This is done by analyzing the picture and looking for landmarks (e.g., playing field markings such as lines, line crossings, circles, characteristic patterns . . . ), also called "features". Based on the location, orientation, size, and/or other characteristics of the features, the system searches the calibration database for a similarly looking set of features. Having found the most similar view, the system retrieves the corresponding camera parameters from the prepared camera calibration database. These parameters can be used unchanged for further processing, or can be refined by automatic feature based position refinement. Camera parameters not contained in the database are estimated and computed more accurately and efficiently than without the database information.
  Output: camera calibration information for each keyframe picture; that is, the camera parameters for the view with the keyframe picture.

Optional: Automatic Camera View Selection
  Input: keyframe pictures
  Optional Input: calibration information
  If multiple views are available, the system works preferably with two. The system selects two of the available views based on user preference (e.g., "main camera", "18 yd left", "18 yd right" before others) and optionally by their view from the calibration or camera parameters (e.g., when looking to the right, select the "main" and "18 yd right").
  Another type of preference is based on a game situation at hand. For example, for a freekick, the cameras behind the goals are chosen, if the goal cannot be seen entirely by two other cameras. In other situations, the cameras closest to a scene of interest can be chosen.
  Output: two or more preferred camera views
    If only two are provided, these can be selected automatically as starting and ending view for the virtual flight interpolation.

Object Detection
  Input: keyframe pictures, feature (e.g., color) model information, calibration information Processing: Multi-view object (player, ball, goal, etc.) detection. The system determines object bounding boxes (OBB) in each of the pictures by using color model information, histogram statistics, calibration information, and known game/people constraints (e.g., the maximum number of players per team, a maximum body size), then assigns the OBBs to an object type (e.g. player and team, referee, goal, etc.).

OBBs denoting the same object in different key frame pictures are linked together; i.e., identified with one another. According to one embodiment, this is done by assuming the objects to be located on a (flat) background surface, and from the position of the OBBs (or segmented objects) in the images, by projecting the objects onto the background surface, determining the location of the objects on the background surface. Two objects as seen in different source cameras 9, 9' and determined to be at the same position on the background surface, can then be assumed to be the same real world object 14.

Optional Input by operator (repeatedly):
Change object or team assignment with interaction in one view.→Automatically updated in other views, too.
Add objects that have not been found automatically, for example by clicking on an image, causing the system to try to identify an object at the location defined by the click, using less restrictive identification criteria than were used in the automatic object detection. Based on the color model, the corresponding class of object (e.g., team) may be guessed by the system automatically.
Remove OBBs that are found on locations where the operator sees no object. This done, e.g., by the operator clicking in the OBB in one view and inputting a command for deleting the OBB in this view, or another command for deleting the OBB and also associated OBB's in other views. Preferably, when the operator clicks on one OBB, the system automatically highlights the associated OBB's in displayed images from the other views.
Limit the maximum number of objects of a particular kind or given type if the limit is known. For example, there is a known maximum number of players of each team (corresponding to a type of objects), and at most one referee and hopefully at most one ball. If more than the maximum number of objects for one type are detected, then assign the most probable objects to that type first, and assign the remaining objects to another type if the color model and/or other information such as team histogram is close enough.
Automatic size adjustment of OBB, increasing or decreasing the size of the OBB provided that there is no overlap with other OBBs and that the cut-out segment inside the OBB crossed or touches the border of OBB.
Output: OBBs for objects in each keyframe picture, linked together/assigned to one another to represent a physical object 14 (e.g., player).

Object Separation
Input: OBBs and feature (e.g. color) model information
Automatic cut-out and blob detection
Optional user input:
"Drawing" into OBB picture to mark parts that must be foreground or background.
OBB update: Changing the size of the OBBs if it is too small, too large, or misshaped.
Output: OBBs with separation mask denoting the relationship of fore- to background for each pixel in the OBBs. An applicable algorithm is, e.g., Graph-Cut.
Optional: Mark each pixel with the likelihood for belonging to foreground (i.e., the real world object 14) or the background.

Background Hole Filling
Input: Separated Objects, Keyframe Images
Output: Hole filled background image without objects
Processing: Automatic hole filling using
Information from background image
Information from previous or later input images, and/or from images from other source cameras 9, 9'.

Virtual Flight Creation
Input: keyframe pictures, camera calibration, OBBs including separation masks. Furthermore, an analysis type may be predefined or input by a user. An analysis type is typically related to the game situation and is associated with one or more potentially interesting virtual views (PIVV).
Processing: the virtual replay unit 13
determines a potentially interesting (depending on the analysis type) virtual view avoiding the visibility of unknown parts.
creates a virtual camera flight path 20 (camera view interpolation) A from the starting camera view to the virtual view.
creates a virtual camera flight path 20 (camera view interpolation) B from the virtual view to the ending camera view.
Optional: If rendering relies only on keyframe picture information, then the known part of the environment is limited, and so are the possible flight paths 20. For this reason, in an embodiment:
The virtual replay unit 13 can check if a flight contains frames that show unknown parts of the environment, and then do one or more of the following:
Inform the human operator, giving him the opportunity to correct the flight path 20.
Change the flight automatically by adding intermediate "key views" that change the flight such that the unknown parts do not become visible anymore. The intermediate key views are preferably added such that the generated flight produces a jiggling free video. This means, that a "point of interest" seen in the image will move on a smooth path relative to the output video, during the entire flight. The point of interest is a point in the image or in the scene which an observer is expected to focus on, such as the ball, or the approximate location of the ball, or a particular player or group of players. The flight thus keeps the point of interest approximately in the middle of the image, or at least does not create sudden changes of the location of the point of interest in the sequence of images, in other words, creating a smooth movement of the point of interest.
The additional views can be chosen such that they keep the point of interest in the resulting video. The point of interest may be determined automatically according to certain rules, or may be input manually by an operator; e.g., by means of a pointing device. Automatic detection can simply consist of detecting the ball, or can be based on the playing situation, the constellation of the detected player positions and the analysis type desired. E.g., while analyzing an offside situation, the system will automatically try to position a computer-generated offside line (which is automatically inserted in the images) on one half of the image, while trying to include the player in possession of the ball as well. These rules can, however, be overruled during the repositioning of the virtual camera due to lack of scene information.

Optional cases:
  The virtual replay unit 13 determines multiple potentially interesting virtual views (typically at the keyframe point), and displays them to the operator who can select one of them. E.g., a high, normal, and low view or angle, or a view including all players, and so on.
  The virtual replay unit 13 creates several potentially interesting virtual views for a flight; e.g., A→V1→V2→V3→B, where V1, V2 and V3 are additional, intermediate virtual views. For example, a first such view can be a along an offside line, and a second one can be from a higher position than the first. The virtual flight may stop at one of these views, allowing for annotation and commenting, and pass through the other view without stopping. In particular, if the flight returns to the initial view A, then it is preferable to have intermediate views that force the flight back to be different than the flight into the keyframe view.
  The virtual replay unit 13 determines multiple virtual flights with different combinations of starting and end views (e.g., camera A→camera A, A→B, B→A) and/or offers different variants (flight over top, flight down, flight direct), giving the operator the possibility to select the most suitable from the offer.
  Optional: Once the virtual view is defined (either automatically or from operator input), the view is rendered and shown on the system output (video feed). For example, a producer, editor, director, moderator, or pundit can then decide upon that preview to use it.
  Optional: Once the virtual flight is defined (either automatically or from operator input), the flight is rendered and shown on the system output (video feed). For example, a producer, editor, director, moderator, or pundit can then decide upon that preview to use it.
  Optional: Adding virtual graphical elements to the scene. Depending on the scene, the system can (automatically or manually by the operator) add virtual graphical elements to the scene. These include (but are not restricted to): an offside line in football, a first-down-line in American football, an arrow, and a distance measurement including distance information (e.g. an arrow or a circle).
  Optional: Animated graphical annotations.
  Optional: 3D graphical elements.
  Optional: Simulated graphical annotation (e.g., physics-based).

In an embodiment, automatic virtual camera placement is done for an Offside situation in football:
  In an analysis type "offside line", the potentially interesting virtual view (PIVV) is automatically determined to be "on" the offside line; that is, above the extension of the offside line to or over the boundary of the playing field; in other words, at least approximately corresponding to the view of the linesman.
  The position and orientation of the camera is chosen according to the constellation of the real world objects 14 and of the unknown parts. If none of real world objects 14 are known, then the position is at the side of the playing field, above the extension of the offside line, while the orientation is chosen, such that the virtual camera looks down along the offside line. Optionally, if the attack direction is, e.g., to the right, then the offside line may be displayed in the right half of the image, leaving a larger area to the left of the offside line for potentially interesting player configurations.
  Changing camera orientation will correct the other camera parameters automatically, such that the offside line is always rendered exactly vertically (from top to bottom) on the image. Consequently, when the virtual camera pans around the vertical axis, it will also be moved sideways along the playing field by a corresponding distance, in order to keep the offset line vertically oriented.
  Optional: The ball may be required to be visible in the virtual view. This is only an option if the ball can be detected reliably.
  The offside line is determined from knowledge from the initial preparation step (playing directions of the teams, depending on time) and the direction of the camera(s).
    If the camera(s) looks to the right side of the field, the team defending on the right defines the offside line and vice versa.
    The position of the offside line is determined by the rules of soccer according to regulations, and the positions of the objects/players 14.
  Optional: The operator can change the location of the offside line; e.g., using the wheel of the mouse, pointing on the picture or by other input means.
  Optional: The suggested PIVV can be corrected quickly by moving the virtual camera, while the offside line remains automatically perpendicular to the image border at all times.
  Optional: If the system output does not meet the requirements of the operator, producer, editor, director, moderator, or pundit, the virtual replay unit 13 can fall back to generate the same output as previously known systems, showing a keyframe from a source camera 9 with, for example, an optionally animated offside line overlaid.
  Optional: A graphical annotation displaying the offside line as a line, or an area, or a 3D visualization, or as a combination thereof.
  Optional: An animation of the offside line.
Other special cases or game situations, analysis types and associated possible PIVVs are:
  Free Kick:
    The PIVV can be: Behind the ball looking to the goal; behind the goal looking to the ball; or bird's eye perspective.
    A graphical annotation can be: Distance circle; distance to goal.
  Goal:
    The PIVV can be: Behind the goal looking to the ball; behind the offensive player looking to the goal; or bird's eye perspective high behind the offensive player looking to the goal.
  Missed goal chance:
    The PIVV can be placed in a bird's eye perspective oriented towards the goal including the offensive player taking a shot, and the player giving the assist if possible.
    Behind the offensive player looking to the goal.

Referee view for referee decision analysis
Goal getter view
Following an object (ball, player, referee, etc.)
Following a user defined path (2D on the field or 3D)
User defined or automatically determined visible points (e.g., players, areas, etc.)

American Football:
   The first down line in American football is determined from knowledge from the initial preparation step (playing directions of the teams, depending on time) and the game situation (team in possession of the ball, and the positions of the objects/players 14) according to the rules of the game. The method for implementing flight path generation is essentially the same as for an offside situation, as explained above.
   Other relevant PIVVs are: Quarterback's View; Running Back View; Defense Center View.

Ice Hockey, etc.:
   The blue line in ice hockey is determined from knowledge from the initial preparation step (playing directions of the teams, depending on time) and the game situation (team in possession of the puck and the positions of the objects/players 14) according to the rules of the game. The method for implementing flight path generation is essentially the same as for an offside situation, as explained above.

Video Playout
   Input: Flight animation information to render it in real-time including the PIVVs
      Optional: The start camera and frame (IN camera, IN frame; together defining an IN point)
      Optional: The end camera (OUT camera)
      Optional: The keyframe timecode
   Processing:
      If no IN camera is defined, the system selects the IN camera:
         As the first available camera.
         Or, by using the camera parameters; that is, where camera stands and where it is looking (characterised, e.g., by its orientation or by the part of the playing field it is looking at) and a set of heuristic decision rules. For example, the IN camera may be automatically determined to be the main game camera having a position around the middle of the field (optionally checking that this camera is looking at the scene of interest defined by the keyframe). If the main camera is not suitable, use the next camera that is closer to the scene of interest. Furthermore, the game situation, as, e.g., identified by the operator, may also be used to determine a preferable camera. The decision rules may be implemented by means of a decision tree, or by selecting the highest scoring camera in the following manner: Different criteria may be assigned a score each, with the total score for each camera being computed as, e.g., a weighted sum thereof.
         Or, by asking the operator to select a camera (on the virtual replay unit 13 or on a video server control unit).
      If no IN point is defined, the system selects an IN frame:
         By rewinding a predefined number of frames.
         Or, by asking the operator to move the current frame of the selected IN camera sequence to the IN frame before continuing (on the virtual replay unit 13 or on a video server 15 control unit 28, 29).
      If no OUT camera is defined, the system selects the OUT camera:
         As the first available camera.
         Or, as the first available camera which is not the IN camera.
         Or, by using the camera parameters in essentially the same heuristic manner as for the IN camera, with the additional rule that the OUT camera should differ from the IN camera selected for this flight.
         Or, by asking the operator to select a camera (on the system or on a video server control unit).
      Optionally, pre-render the flight from IN camera to the PIVVs and then to the OUT camera.
   Output: A video sequence (replay) of the given situation consisting of:
      A pre-clip: The video sequence from the IN point to the KEYFRAME of the sequence. Optionally, slowing down the replay of the video before the KEYFRAME.
      A flight from the IN camera to one or more virtual perspectives and to the OUT camera.
         Optionally, enhanced with (animated or simulated) automatic or manual graphical annotations.
         Optionally, stop the flight in the virtual view for a given time.
         Optionally, fly to other views before returning to the final OUT camera.
      Optionally, go to the next KEYFRAME.
      A post-clip: The video sequence of the OUT camera from the KEYFRAME as long as required (can be restricted by the available video clip or stopped by the operator).
      Optionally, the output can be slowed down.
   Optional Outputs:
      If, for example, the producer decides that the given virtual view of the situation is not acceptable, the system can play out a video sequence WITHOUT a virtual flight but only with the annotations in perspective and chromakeyed (similar to traditional systems).
         Example Offside: Playback from IN to KEYFRAME, stop, animate line to position, animate line out, play from KEYFRAME to OUT.
         Example Freekick: Playback from IN to KEYFRAME, stop, animate distance circle or distance to goal (or both), annotation animate away, play from KEYFRAME to OUT.

While the invention has been described in present embodiments, it is distinctly understood that the invention is not limited thereto, but may be otherwise variously embodied and practised within the scope of the claims.

LIST OF DESIGNATIONS

7 feature
8 scene
9, 9' source camera
10, 10' source image sequence
11 virtual camera
12 virtual image
13 virtual replay unit
14 real world object, player
15 video server
16 storage unit
17 transmitter
18 video display device
19 interface unit
20 virtual camera flight path 21 video input streams
22 video output streams
23 video (stream) input to virtual replay unit
24 video stream output from virtual replay unit
25 communication link
26 first control link
27 second control link
28 replay unit control interface
29 server control interface

What is claimed is:

1. A computer-implemented image-processing method for instant replay for the automatic generation of video sequences, the method comprising the steps of, in an online phase of the method:
   providing or enabling at least one source camera that is adapted to provide a source image of a scene,
      wherein the pose and optical settings of the camera define a view of the camera, and
      wherein the pose and optical settings are described by a set of camera parameters;
   inputting a user input defining a reference keyframe from a reference view from the source image sequence, the reference keyframe being a video image from the point in time at which the user wishes the subsequently generated virtual replay to take place;
   retrieving the reference keyframe from a recording of the source image sequence; and optionally retrieving one or more further keyframes from further views from recordings of further source image sequences of the scene, each further keyframe having been recorded at the same point in time as the reference keyframe, subsequently called keyframe point;
   automatically computing one or more sets of virtual camera parameters, each set describing a virtual view of the scene by a virtual camera;
   if more than one set of virtual camera parameters has been computed, selecting one of the sets for the subsequent processing steps, the virtual view defined by the selected set subsequently being called selected virtual view; or if only one set of virtual camera parameters has been computed, using the corresponding virtual view as the selected virtual view;
   generating a virtual camera flight path, which is described by a change of virtual camera parameters over time, and which defines a movement of the virtual camera and a corresponding change of the virtual view
      from a first view to the selected virtual view, the first view being the reference view or, optionally, one of the further views, and then
      from the selected virtual view to a second view, the second view being the reference view or, optionally, one of the further views;
   rendering a virtual video stream defined by the virtual camera flight path; and
   at least one of storing the virtual video stream in a computer-readable storage device and transmitting the virtual video stream over a communication link.

2. The method according to claim 1, wherein the step of automatically computing one or more sets of virtual camera parameters, comprises the steps of:
   automatically computing the position of objects in the scene;
   determining a classification of the situation observed in the scene, in particular by retrieving a user input that specifies this classification; and
   automatically computing at least one set of virtual camera parameters based on the position of objects in the scene and the classification of the situation.

3. The method according to claim 1, wherein the step of selecting one of the sets of virtual camera parameters defining the selected virtual view for the subsequent processing steps comprises the steps of:
   automatically generating, for each of the sets of virtual camera parameters, the corresponding virtual view and the corresponding virtual image of the scene, subsequently called virtual keyframe at this point in time; and
   displaying the virtual keyframes on an image display device and inputting a user selection indicating one of the virtual keyframes, and using the associated virtual view as the selected virtual view for the subsequent processing steps.

4. The method according to claim 2, wherein the step of selecting one of the sets of virtual camera parameters defining the selected virtual view for the subsequent processing steps comprises the steps of:
   automatically generating, for each of the sets of virtual camera parameters, the corresponding virtual view and the corresponding virtual image of the scene, subsequently called virtual keyframe at this point in time; and
   displaying the virtual keyframes on an image display device and inputting a user selection indicating one of the virtual keyframes, and using the associated virtual view as the selected virtual view for the subsequent processing steps.

5. The method according to claim 1, the method further comprising the following steps being executed in a preparatory phase preceding the online phase:
   creating a feature model for the detection and separation of foreground objects from a background;
   determining, from multiple images obtained from a camera observing a scene with known features, fixed camera parameters that do not change during later video capturing; and
   storing the feature model and the fixed camera parameters in a computer-readable storage means, to be retrieved and used by later image processing.

6. The method according to claim 5, wherein the feature model is a color model and comprises color models corresponding to different classes of foreground objects.

7. The method according to claim 1, the method further comprising the following steps being executed in a preparatory phase preceding the online phase:
   sampling a plurality of images from views covering a potential camera configuration space;
   locating and identifying features in these images;
   determining camera parameters corresponding to these views;
   storing, as reference information, the features and feature location relative to the respective image; and
   storing an association from the reference information to the camera parameters in a computer-readable storage means for later retrieval for fast camera calibration based on image features.

8. The method according to claim 1, the method further comprising the step of, in a preparatory phase, inputting information about playing directions of the teams and time information associated therewith, specifying the time during which the playing direction is valid.

9. The method according to claim 1, when at least two source image sequences from at least two source cameras are being processed, comprising the steps of:

automatically identifying foreground objects extracted from one of the source image sequences with foreground objects of the one or more remaining source image sequences; and automatically, without user interaction, determining the position of these foreground objects in the scene.

10. The method according to claim 1, wherein, in the step of generating a virtual camera flight path, the following steps are executed for automatically determining the first view and the second view:

if only one source image sequence is available, choosing the first and the second view to be identical to the reference view; and if two source image sequences are available, choosing at least one of the views to be from a source camera that is situated closer to the observed scene than the other source cameras.

11. The method according to claim 1, further comprising the following steps:

designating one of the source cameras as being a leading camera; and automatically selecting the source camera that is used for least one of the first and second views according to the viewing direction of the leading camera,
wherein said selected source camera is preferably a camera that is located on the side of the leading camera towards which the leading camera is looking.

12. The method according to claim 1, wherein, for generating a virtual camera flight path, the following steps are executed:

generating a set of virtual camera flight paths for different combinations of first view, virtual view, and second view;

displaying a graphical representation of each of the set of virtual camera flight paths on an image display device and inputting a user selection indicating one of the virtual camera flight paths; and then using the selected virtual camera flight path for rendering the virtual video stream.

13. The method according to claim 1, wherein the step of generating a virtual camera flight path comprises the steps of:

given the selected virtual view, the first view, and the second view, retrieving the sets of camera parameters describing these views;

interpolating the set of virtual camera parameters, starting with the values from the set of camera parameters corresponding to the first view, changing to the values of the set of camera parameters corresponding to the selected virtual view, and then changing to the values of the set of camera parameters corresponding to the second view;

verifying, for all or for a subset of the views along the virtual camera flight path, whether the respective image for the view comprises areas for which there is no image information from the available keyframes;

if the amount of missing image information in one or more of these views exceeds a predetermined limit, then, automatically or by means of a user interaction, determining one or more intermediate key views for which the amount of missing image information is smaller than for the views(s) with missing information, or zero, and computing the virtual camera flight path to pass through these key views.

14. The method according to claim 12, wherein the step of generating a virtual camera flight path comprises the step of: when interpolating the set of virtual camera parameters, maintaining in the sequence of views of the virtual flight path a smooth movement of a stationary or moving point of interest in the scene.

15. The method according to claim 1, the method further comprising the steps of:

if no selected virtual view or no satisfying virtual camera flight path is determined by the virtual replay unit or chosen by the user, then:

generating an enhanced still image from the reference keyframe or one of the further keyframes, and subsequently using the enhanced still image in place of the virtual video stream.

16. The method according to claim 1, the method further comprising the steps of:

generating a concatenated video sequence comprising, in this order:

a first video sequence from a first source camera leading up to and ending with the keyframe in the first view, the virtual video stream, starting with from the keyframe in the first view and ending with the keyframe in the second view, and a second video sequence from a second source camera starting with the keyframe in the second view.

17. The method according to claim 1, the method being implemented by means of a video server interacting with a virtual replay unit, the video server being configured to record and store video input streams and being controllable to output video output streams made up of incoming and stored video input streams, the virtual replay unit being configured to generate, from the one or more keyframes corresponding to different views of the scene at the same point in time, the virtual video stream; and the method comprising the steps of:

the video server transmitting to the virtual replay unit one or more keyframes, either by one of the video output streams or by a separate communication link; and the virtual replay unit generating the virtual video stream.

18. The method according to claim 16, the method being implemented by means of a video server interacting with a virtual replay unit, the video server being configured to record and store video input streams and being controllable to output video output streams made up of incoming and stored video input streams, the virtual replay unit being configured to generate, from the one or more keyframes corresponding to different views of the scene at the same point in time, the virtual video stream; and the method comprising the steps of:

the video server transmitting to the virtual replay unit one or more keyframes, either by one of the video output streams or by a separate communication link; and the virtual replay unit generating the virtual video stream.

19. The method according to claim 18, further comprising the steps of:

the virtual replay unit controlling the video server to transmit to the virtual replay unit the one or more keyframes (i.e., the reference keyframe and the optional further keyframes); and only one of the following two groups of steps:

the virtual replay unit, having computed the virtual video stream, controlling the video server to transmit to the virtual replay unit the first video sequence and the second video sequence, and the virtual replay unit concatenating the first video sequence, the virtual video stream and the second video sequence; or the virtual replay unit, having computed the virtual video stream, transmitting the virtual video stream to the video server and controlling the video server to concatenate the first video sequence, the virtual video stream, and the second video sequence.

20. The method according to claim 18, further comprising the steps of:
the video server transmitting to the virtual replay unit the one or more keyframes;
the video server controlling the virtual replay unit to compute the virtual video stream, preferably by triggering the virtual replay unit to do so; and
only one of the following two groups of steps:
the video server transmitting to the virtual replay unit the first video sequence and the second video sequence, and the video server controlling the virtual replay unit to concatenate the first video sequence, the virtual video stream, and the second video sequence, or
the virtual replay unit, having computed the virtual video stream, transmitting the virtual video stream to the video server and controlling the video server to concatenate the first video sequence, the virtual video stream, and the second video sequence.

21. The method according to claim 19, further comprising the steps of:
the video server transmitting to the virtual replay unit the one or more keyframes;
the video server controlling the virtual replay unit to compute the virtual video stream, preferably by triggering the virtual replay unit to do so; and
only one of the following two groups of steps:
the video server transmitting to the virtual replay unit the first video sequence and the second video sequence, and the video server controlling the virtual replay unit to concatenate the first video sequence, the virtual video stream, and the second video sequence, or
the virtual replay unit, having computed the virtual video stream, transmitting the virtual video stream to the video server and controlling the video server to concatenate the first video sequence, the virtual video stream, and the second video sequence.

22. A virtual replay unit for image processing for instant replay, comprising:
one or more programmable computer data-processing units, being programmed to:
input one or more keyframes,
perform the steps of the method according to claim 1, and
output at least one virtual video stream generated according to the method claim steps performed.

23. A non-transitory, computer-readable medium, comprising computer-program code recorded thereon,
wherein when said code is loaded onto a computer, said computer is caused to execute steps to perform the method according to claim 1.

* * * * *